United States Patent

[11] 3,598,920

[72] Inventors James L. Fischer
Corinth, Miss.;
Carroll D. Hays, Brownsburg, Ind.;
Richard G. Klier, Indianapolis, Ind.

[21] Appl. No. 870,040

[22] Filed Oct. 28, 1969

[45] Patented Aug. 10, 1971

[73] Assignee Bell Telephone Laboratories, Incorporated
Murray Hill, N.J.

[54] COIN TELEPHONE FACILITY FOR COMBINED USE BY GENERAL PUBLIC AND PHYSICALLY HANDICAPPED
11 Claims, 8 Drawing Figs.

[52] U.S. Cl. .......... 179/6.3

[51] Int. Cl. .......... H04m 17/02

[50] Field of Search .......... 179/6.3, 146, 183; D179/26, 14.1

*Primary Examiner*—Kathleen H. Claffy
*Assistant Examiner*—Jan S. Black
*Attorneys*—R. J. Guenther and Edwin B. Cave

ABSTRACT: In a coin telephone facility designed for use by both physically handicapped persons and the general public, a vertical wall mounted portion supports a forwardly sloping shelf portion. For easy access, the telephone handset, the pushbutton dial and an oversized coin return lever are mounted on the shelf portion. A mechanism below the shelf operated by the coin return lever raises refunded coins and delivers them into a shelf-level receptacle.

INVENTORS J.L. FISCHER
C.D. HAYS
R.G. KLIER
BY
ATTORNEY

COIN TELEPHONE FACILITY FOR COMBINED USE BY GENERAL PUBLIC AND PHYSICALLY HANDICAPPED

BACKGROUND OF THE INVENTION

1. Field of the Invention

This invention relates to coin-operated telephone facilities and more particularly to facilities adapted both to the needs of the general public and to the needs of the physically handicapped.

2. Description of the Prior Art

In recent years a number of advances have been made in the area of public coin-operated telephone facilities. Booths for outdoor use, for example, have been improved from the standpoint of both convenience and esthetics. Greater attention has been paid to the human engineering factors involved, and considerable care has been exercised to achieve the best possible combinations of booth size, instrument height, cord length and the like to fit the needs of the average user. Additionally, careful selections of materials and modifications in structural form have resulted in reduced costs in both fabrication and maintenance. Similar advances have been made in indoor coin telephone installations which include increased versatility from interfitting shelf-type facilities that have been designed and engineered to meet a wide spectrum of space and convenience requirements.

Despite all of the noted advances and improvements in the public coin telephone field, little if any consideration has been given heretofore to the needs of a large and growing segment of the population—the physically handicapped. Many handicapped people, whether ambulatory or nonambulatory are solely dependent on public coin telephones for contact with the outside world. This group consists largely of patients in welfare hospitals, veteran's hospitals, nursing homes, sanitariums and the like. Increasingly, however, patients with permanent disabilities or physical handicaps of one sort or another are being returned to independence in the general population but, with limited earning ability, personal economics prohibits private telephones and dependence on public phones remains.

For the nonambulatory or wheelchair handicapped, access to telephones in conventional booths or to telephones in conventional shelf units is either impossible or at best extremely difficult. For those with upper limb disabilities affecting motor control, even access to the conventional telephone instrument itself is insufficient since many persons with such handicaps lack the necessary two-handed manual dexterity that normal telephone use requires.

SUMMARY OF THE INVENTION

The broad object of the invention is to make public coin telephone service more readily available to the physically handicapped. This object and related objects are achieved in accordance with the principles of the invention by a unique telephone shelf facility which includes a variety of features that make coin telephone service more convenient not only for the user who is physically disabled but also for members of the general public without, however, an sacrifice in esthetics, in cost or inservice quality.

In one illustrative embodiment of the invention, the unit is formed by a wall-supported vertical front portion and a forwardly sloping shelf portion at the proper height to accommodate a user in a wheelchair. The pushbutton dial is mounted on the shelf face to permit the user co support his arm on the shelf while operating the dial in order to require minimal physical effort and dexterity.

Another feature of the invention pertains to the position and configuration of the handset-securing means. For maximum access, the handset is rested on a pair of raised supporting brackets or cradles so that it may readily be lifted off hook with outstretched fingers or with the flat of the hand—grasping with the fingers is not required. The switch hook is mounted in one of two cup-shaped receptacles. For additional convenience, the receiver end of the handset may be rested in the second receptacle while in the off hook mode, freeing both hands of the user for coin-handling and dial operation.

Other features of the invention relate to a coin return mechanism that employs a drumlike housing mounted below the desk level. Coins discharged into the housing from the coin telephone proper are swept up to the desk level by a rotatable vane member and deposited in a shallow depression in the desk to facilitate easy retrieval. The coin return lever that operates the vane member protrudes upwardly from the desk surface and may easily be operated either by the hand or forearm of the user.

DETAILED DESCRIPTION

General Assembly

Figure 1:
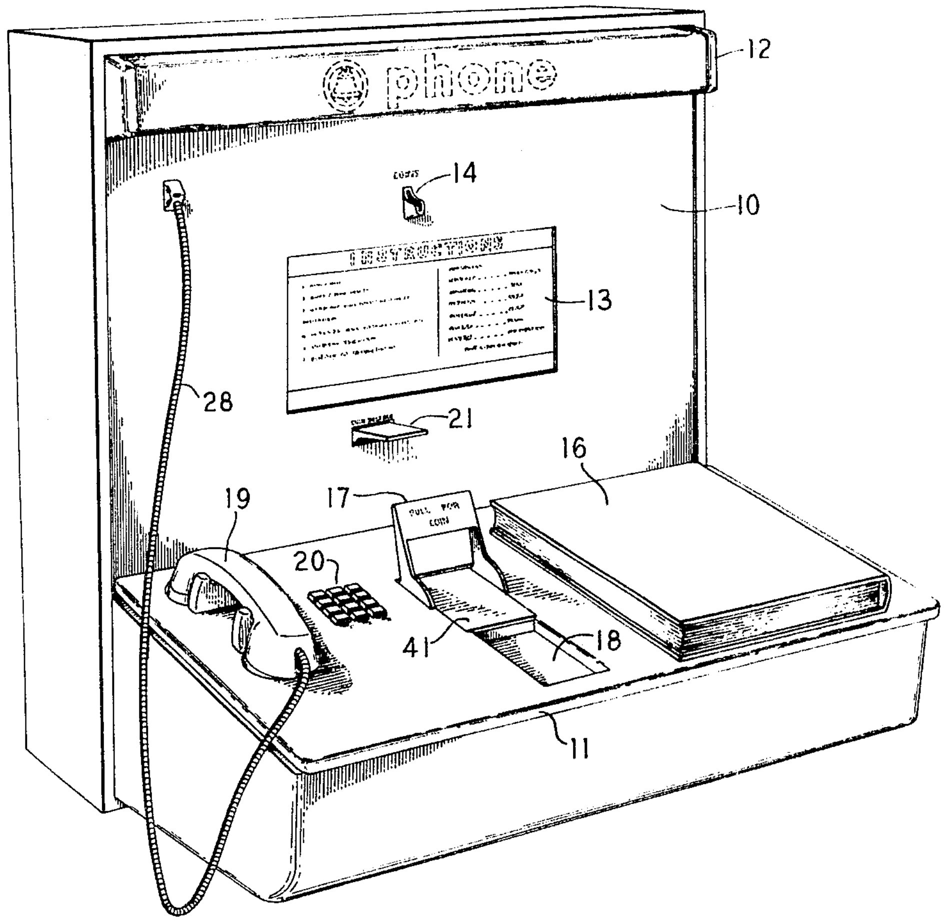
FIG. 1 is a perspective view of the outside of the front panel and shelf assembly of a telephone shelf unit in accordance with the invention.

As shown in FIG. 1, a telephone facility in accordance with the invention includes a front panel member 10 with an outwardly sloping shelf assembly 11 affixed to the lower portion thereof. The front panel 10 provides a mounting surface for a display sign 12, an instruction panel 13, a coin entrance device 14 and a coin release lever 21. The shelf assembly accommodates a telephone directory arrangement 16, a coin return handle 17 and a depressed coin return receptacle 18 for a coin return mechanism which, in FIG. 1, is otherwise hidden from view. A special mounting arrangement for a handset 19 is on the far left portion of the face of the shelf 11, and a conventional pushbutton dial 20 is mounted between the handset 19 and the coin return handle 17. The entire unit may advantageously be attached to a wall or other supporting surface with a plywood backboard, not shown. Assembly may advantageously be effected by fastening a steel panel, to a bezel and then fastening the shelf 11 to the panel 10 and bezel. The bezel and shelf are fastened to the housing with a full-length hinge, not shown, on the left side and a locking mechanism on the right side to facilitate service access to the coin telephone. Mechanisms which are on the shelf assembly 11 are installed from the bottom and the entire assembly is then suitably covered with a stainless steel pan, for example, which provides protection and a pleasing appearance.

Coin Entrance Device

A flush-mounted coin entrance slot is totally unsatisfactory for users lacking average finger dexterity. In accordance with the invention, this problem is met by a pair of lip members 14, open at the top and closed at the bottom, which provide a coin entrance slot, which permits the user to grasp the lips and steady his hand while he deposits the coin. The normal faceplate is removed from the coin telephone unit proper, which is hidden, and accordingly, the coin entrance device 14 must also provide gaging to keep out oversized slugs. This function is provided for, in accordance with the invention, by designing the lips 14 with an inner contoured or cutaway portion so that a slug which is too wide will roll out instead of remaining inside the coin entrance and blocking the set. A slug with an oversized diameter will remain in the coin entrance but the sides of the lips 14 are cut away sufficiently to permit easy removal of the slug.

Coin Release Lever

As in the case of the coin entrance slot, conventionally designed coin release levers require excessive manual dexterity to permit convenient operation by many handicapped people. In accordance with the invention, the coin release lever 21 is made relatively wide and flat so that operation may be effected with minimum use of the fingers and may, in fact, be operated quite readily with the arm or hand alone. The lever 21 is so mounted that only slight pressure on the top portion thereof is translated into a downward rotation. This rotational movement is in turn translated and transmitted to the coin telephone mechanism itself, not shown, by a push-pull cable. Such a system has substantial advantages over a link and lever system, the most important being that the front cover of the coin telephone set proper, not shown, may be readily removed whenever necessary. Further, the cable arrangement allows the release mechanism to be adjusted while the unit is open and the operation can be visually checked. The problem of reconnection when the panel is closed is eliminated with the use of a cable system inasmuch as the cable remains connected and swings with the front panel 10 when it is opened.

Coin Return Mechanism

In conventional coin telephone practice, operation of the coin release lever dumps coins that are to be refunded into a small trap or bucket device in the lower portion of the set, and the money thus returned is retrieved from the bucket assembly by inserting one or two fingers and withdrawing the coins. Here again, however, the manual dexterity required exceeds the abilities of many handicapped users. This problem is met, in accordance with the invention, by collecting the coins at a level below the top surface of the shelf 11 in response to the operation of the coin release lever 21 and raising the coins to the shelf level by simply pulling forward on the coin return lever 17 so that the coins are delivered into a depressed return area 18 for easy retrieval.

Figure 6:
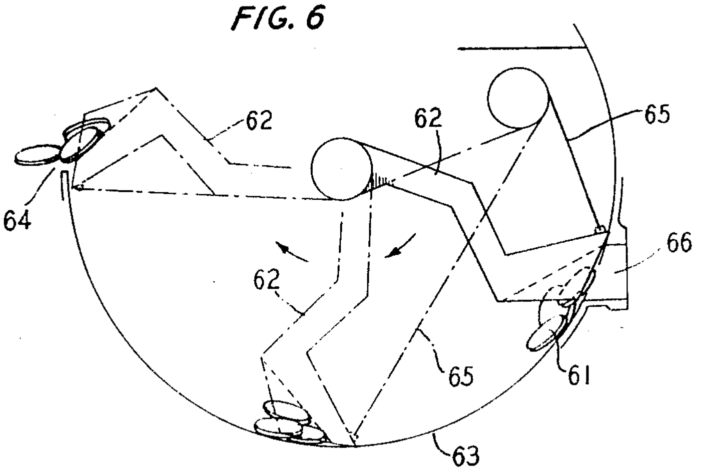
FIG. 6 is a schematic mechanical diagram of the operation of the coin vane inside the coin return housing.

The general principle of operation of a coin return mechanism in accordance with the invention is illustrated schematically in FIG. 6, where a number of coins 61 are shown being ejected from a coin telephone coin return opening 66. Operation of the coin return lever 17, shown in FIG. 1, is translated into rotational movement of the vane 62. The coins 61 are held collected in a coin return housing 63. Rotational movement of the vane 62 in the direction of the small arrows sweeps the coins upwardly to a position 64 which delivers them to the user in the coin return area 18, shown in FIG. 1. The vane 62 tensions a spring 65 so that upon release at the end of its travel, the vane is automatically returned to its initial position.

Figure 8:
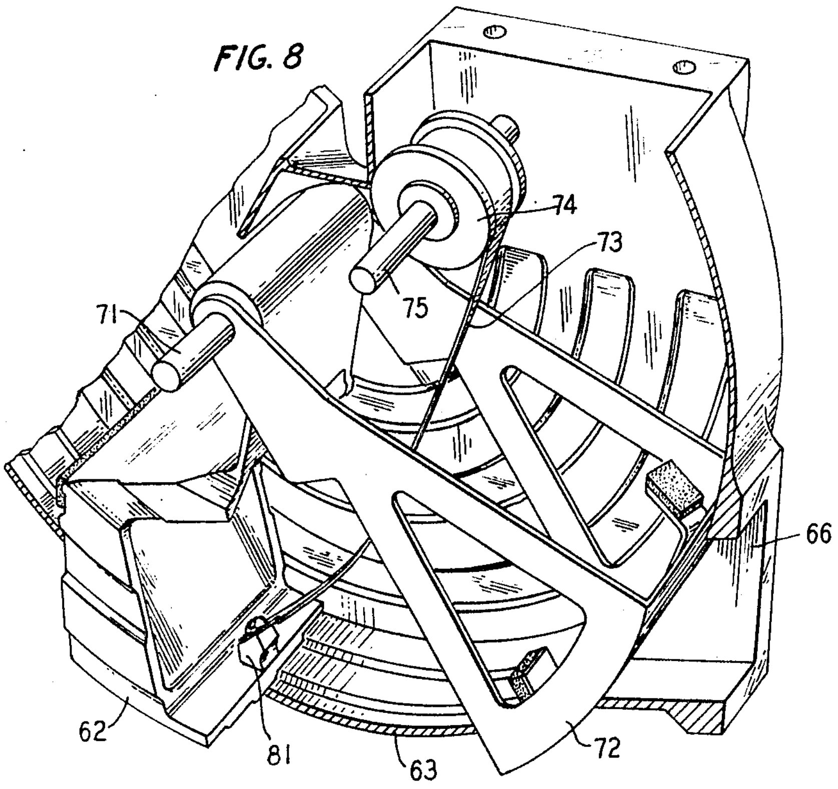
FIG. 8 is a view of the coin return housing assembly as shown in FIG. 7 with the coin vane, however, shown in a partially operated position.
Figure 3:
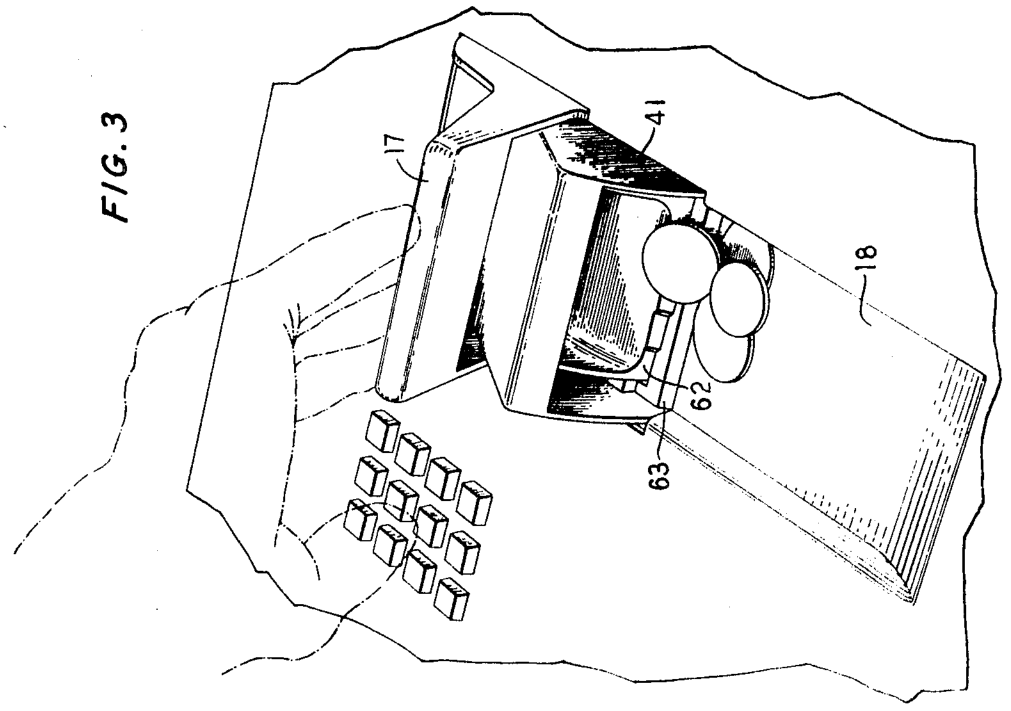
FIG. 3 is an enlarged view shown in perspective of the outside of the coin return mechanism of FIG. 1 shown, however, in the operated position.
Figure 4:
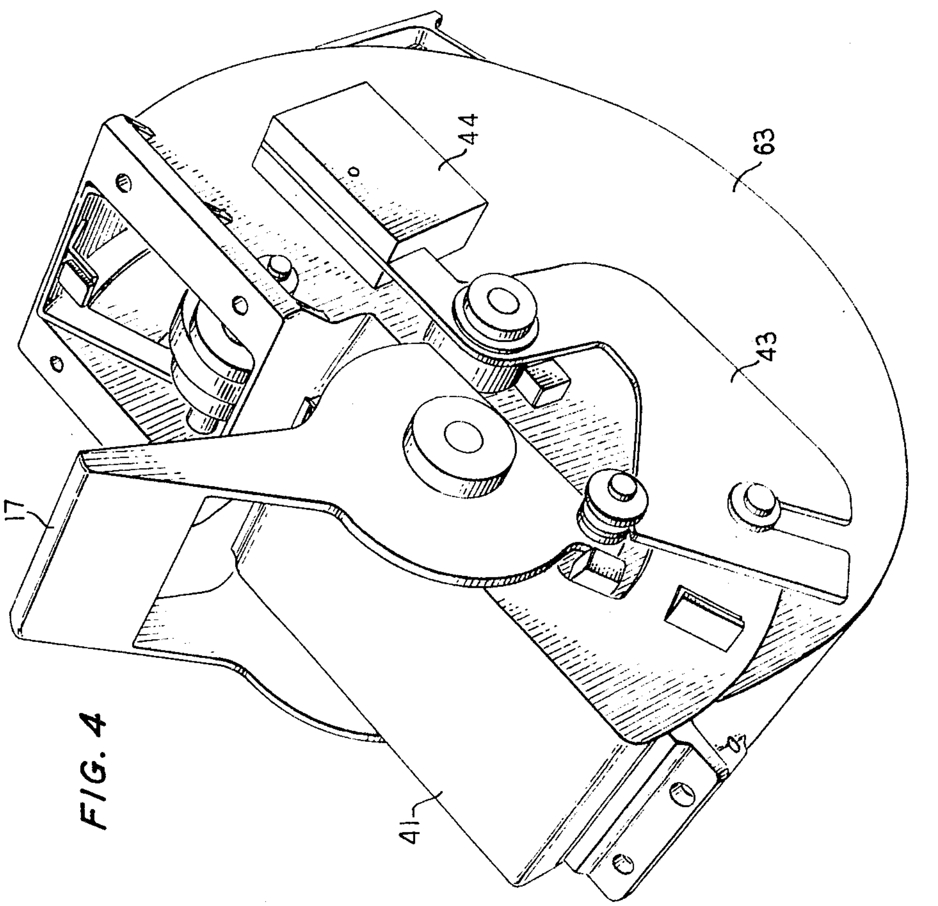
FIG. 4 is a perspective view of the right side of the coin return housing assembly.
Figure 5:
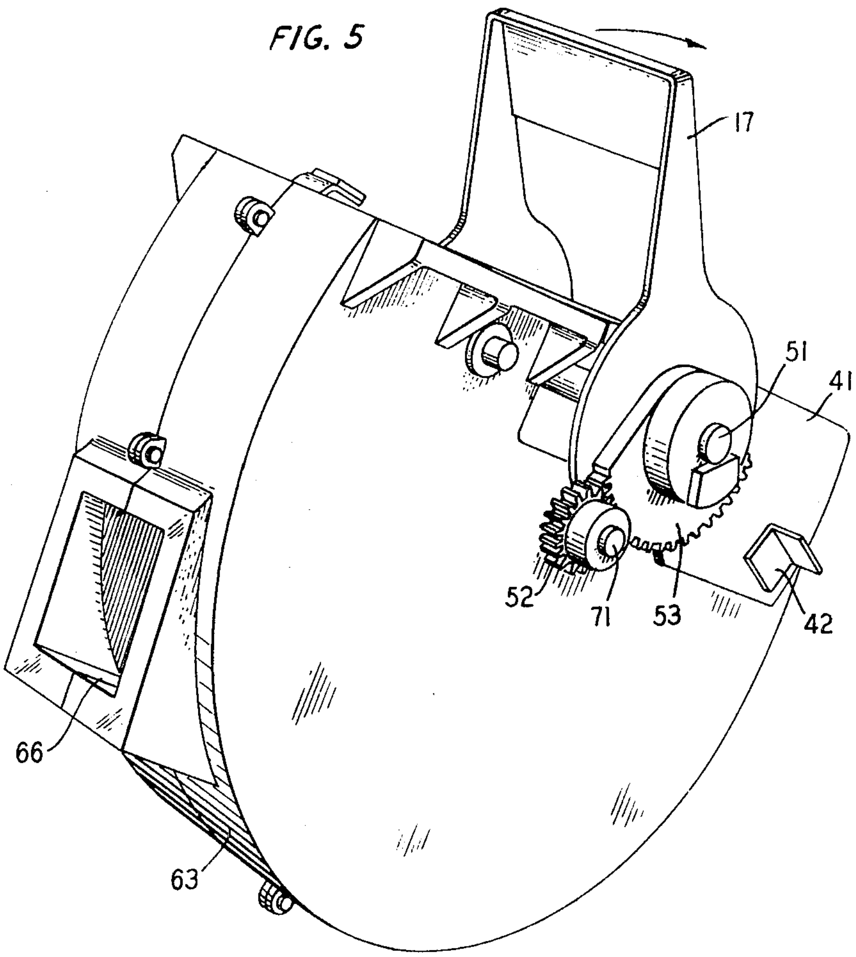
FIG. 5 is a perspective view of the left side and rear portion of the coin return housing assembly shown in FIG. 4.
Figure 7:
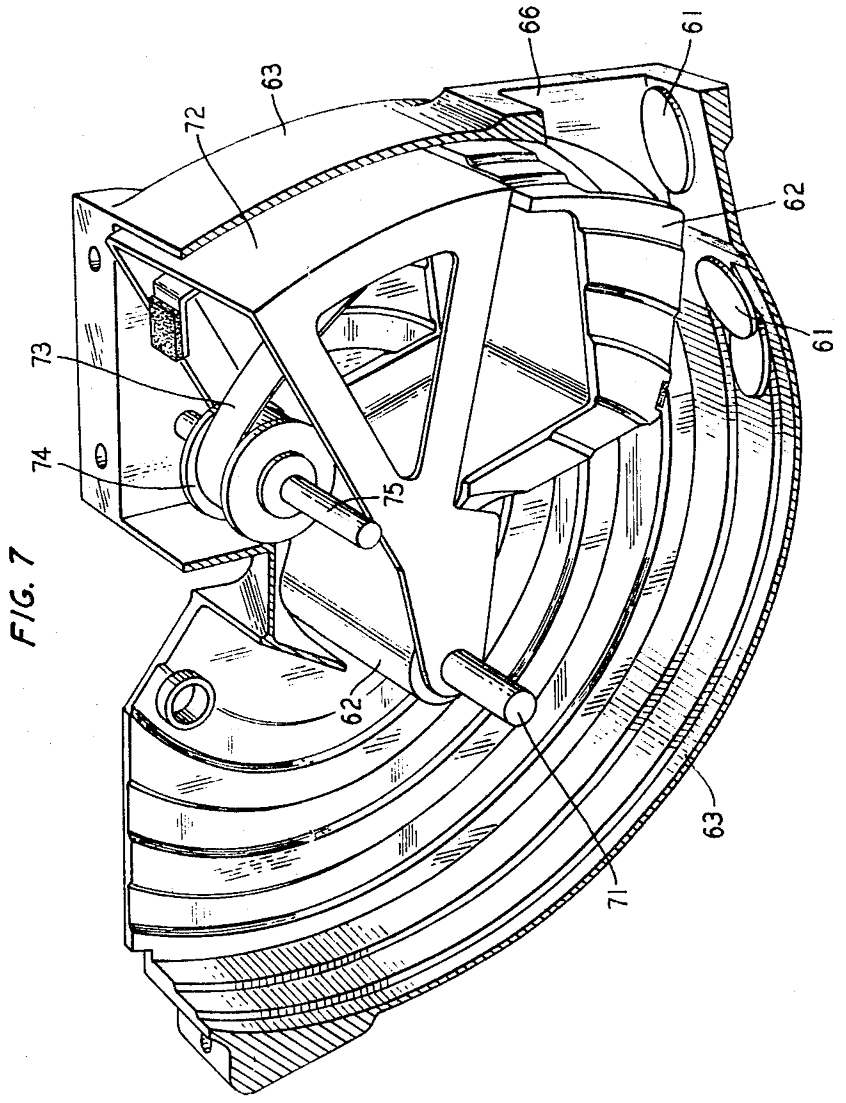
FIG. 7 is a perspective view, partially cut away, of a portion of the coin return housing assembly with the vane in the unoperated position.

Details of the coin return housing assembly mechanism which accomplished the operation described immediately above are shown in FIGS. 3, 4, 5, 7 and 8. As shown in FIG. 5, the coin return lever 17 is mounted for rotational movement on a shaft 51 which is in turn supported by the coin return housing 63. Rotation of the shaft 51 drives a spur gear 52 through a sector gear 53. The spur gear 52 drives a shaft 71, also shown in FIG. 7, on which the vane 62 is fixedly mounted so that the vane 62 sweeps around inside the coin return housing 63, pushing released coins before it and delivering them at shelf level into the coin return area 18 as shown in FIG. 3. NOT SHOWN, THEY PASS THROUGH THE OPENING %% AND INTO THE BOTTOM OF THE COIN RETURN HOUSING '0. Since the coin return housing 63 will obviously hold more coins than When the unit is in the normal or unoperated position, the vane 62 is in the position above the coin opening 66 as shown in FIG. 7. As indicated, when the coins are released by the coin telephone, not shown, they pass through the opening 66 and into the bottom of the coin return housing 63. Since the coin return housing 63 will obviously hold more coins than are normally released by the coin telephone, it is unlikely that coins will get behind the vane 62. It is possible, however, for coins to be released after the vane 62 has passed the coin opening 66. Such an arrangement, standing alone, would therefore allow coins to fall behind the vane 62 where they could not readily be retrieved. This problem is met in accordance with the invention by the use of a door 72 which is mounted for rotational movement on the shaft 71. The door 72, which is normally supported by the vane 62, moves downwardly under the force of gravity, as the vane rotates, so that the coin opening 66 is covered after the vane 62 has passed, as shown in FIG. 8. Thus, any coins coming from the telephone rest against the door 72 until the vane 62 returns to its normal position. At that point, the vane 62 lifts the door 72 and the coins fall in front of the vane from which position they can be swept out when the coin return mechanism is operated.

As shown in FIGS. 7 and 8, a band spring 73 mounted on a spool 74 which turns on a shaft 75 is attached to the vane 62 by a securing device 81, FIG. 8, in order to ensure that the vane 62 is returned to its normal horizontal position, and is retained in that position when the coin return handle 17 is released. In accordance with the invention, a negator constant force spring 73 is employed and as the vane rotates, the spring is allowed to wrap around the vane so that the spring exerts its greatest force when in the normal position, which force is diminished as the coin return mechanism is operated. By this arrangement, ease and convenience of operation are considerably enhanced.

Since the coin return mechanism, as in any other coin telephone, is exposed constantly to the public, it has been designed, in accordance with the invention, to prevent vandalism and fraud. Specifically, the coin return mechanism is provided with a cover 41 which in its closed position forms a part of the shelf 11. The cover 41, which may be fabricated from stainless steel for example, is locked shut when the handle 17 is in the normal or unoperated position, as shown in FIG. 1. A cam 43, shown in FIG. 4, is used to provide for this locking function. As also shown in FIG. 4, the cam 43 is driven by the handle 17. The timing of the cam 43 is so arranged that the door member 72, shown in FIGS. 7 and 8, is permitted to close the coin opening 66 before the cover 41 can be opened. This arrangement prevents access to the coin opening 66 by lifting the cover 41. The cover 41 is opened by the force of the vane 62 as it impinges against the underside of the cover 41 and, in accordance with the invention, a sudden increase in the operating force that would otherwise be required at the end of the travel of the handle 17 is avoided by the action of a counterweight 44, as shown in FIG. 4, which serves to provide a balancing force. As a result, the coin return mechanism may be operated readily with a force on the order of 400 grams exerted on the handle 17.

Switch Hook and Handset

Figure 2:
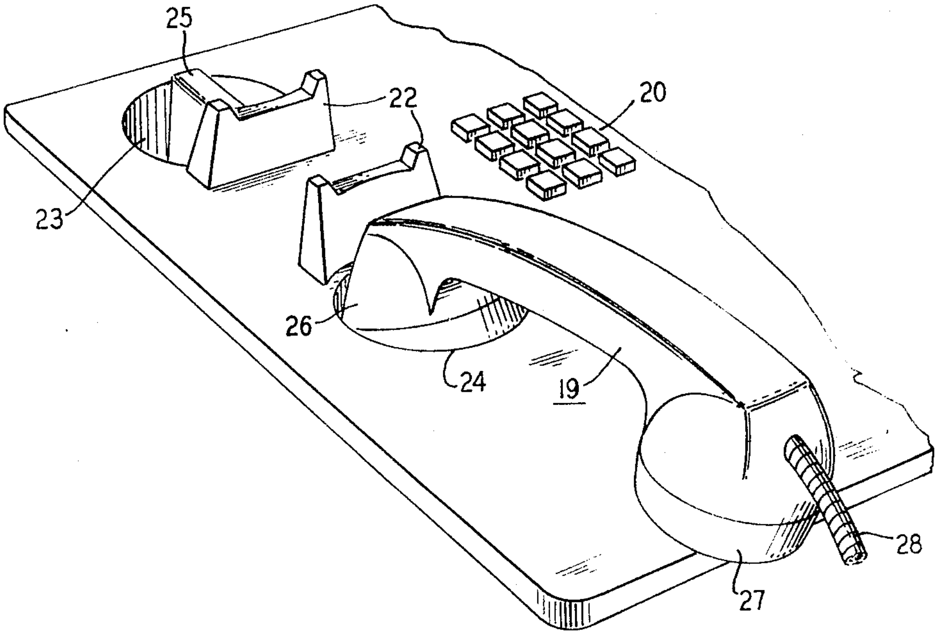
FIG. 2 is an enlarged view of the handset-mounting portion of the shelf member shown in FIG. 1.

As shown in FIG. 1 and in greater detail in FIG. 2, a handset 19, which includes a transmitter portion 27 and a receiver portion 26 is normally rested on a pair of cradles 22. In the position shown in FIG. 1 the receiver portion is over a cavity 23 in the shelf 11 and the transmitter portion is over a similar cavity 24. A switch hook plunger 25 is mounted within the cavity 23 so that with the handset in position as shown in FIG. 1, the switch hook plunger is operated. The switch pileup and the connecting linkage to the switch hook plunger 25 are not shown but are substantially conventional.

The cradles 22 are of sufficient height and are spaced apart enough to enable a user to raise the handset 19 with outstretched fingers or with the flat of the hand without curling the fingers in a grasping action. The handset can then be lifted and positioned for use with a minimum of manual dexterity.

The cavity 24 provides a convenient off-hook resting place for the transmitter portion 26 of the handset 19 so that the user may have both hands free to facilitate dialing or coin handling. This feature is especially advantageous for users with limited manual dexterity.

The handset cord 28 is located on panel 10. The handset 19 may be easily retrieved, if dropped, by grasping the cord. Cord length is selected to prevent handset 19 from hitting the floor if dropped.

It is to be understood that the embodiment described herein is merely illustrative of the principles of the invention. Various modifications thereto may be effected by persons skilled in the art without departing from the spirit or scope of the invention.

What we claim is:

1. A pay telephone facility comprising, in combination, a vertical panel portion, a downwardly sloping shelf portion protruding outwardly from the lower part of said portion, a handset supported by raised brackets mounted on said shelf portion to facilitate easy removal of said handset without manual grasping thereof, a dial assembly mounted on said shelf portion, a substantially flat coin release lever protruding from said shelf portion to enable operation thereof with slight downward pressure exerted by the hand or arm of the user, a coin return mechanism mounted beneath said shelf portion and a coin return lever protruding upwardly from said shelf portion for operating said mechanism, said lever being mounted to enable operation thereof by pull force away from said shelf portion.

2. A pay telephone facility comprising, in combination, a vertically mounted panel portion, a downwardly sloping shelf portion protruding outwardly from the lower part of said panel portion, a handset, a dial and a coin return mechanism operating lever mounted on said shelf portion and a coin deposit slot guide member and a coin release lever mounted on said panel portion, thereby to facilitate telephone operation by users in wheelchairs and by handicapped persons lacking in manual dexterity.

3. Apparatus in accordance with claim 2 including raised brackets for supporting said handset in a plane substantially parallel to and above said shelf portion and a pair of apertures in said shelf portion for accommodating the receiver and transmitter portions of said handset when said handset is resting on said brackets, one of said depressions housing switch hook means and the other of said depressions accommodating the receiver portion of said handset to facilitate placing said handset in a rest, off-hook position.

4. Apparatus in accordance with claim 2 wherein said coin release lever comprises a flat handle portion normally substantially horizontally disposed, and movable rotatably downward in response to pressure exerted on the top thereof and means including a push-pull cable for translating the downward rotational movement of said handle portion into a linear force for application to the coin release mechanism of a coin telephone set.

4. Apparatus in accordance with claim 2 wherein said coin return mechanism operating lever comprises a substantially flat handle portion and means mounted below the level of said shelf portion responsive to pull force on said handle portion for raising refunded coins to the level of said shelf portion.

6. Apparatus in accordance with claim 5 wherein said last-named means comprises a drumlike receptacle with an entrance aperture and an exit aperture for said coins, and a rotatably mounted vane member responsive to the movement of said handle portion for sweeping said refunded coins from said receptacle and out said exit aperture, said coins being delivered thereby to a depressed coin collection area on said shelf portion.

7. Apparatus in accordance with claim 6 further including a rotatable door member mounted within said receptacle and normally supported by said vane member, said door rotating by gravity force behind said vane member thereby to block said entrance aperture after said vane member has passed said entrance aperture, whereby coins are prevented from collecting behind said vane member.

8. A pay telephone facility comprising, in combination, a vertically mounted panel portion, a downwardly sloping shelf portion protruding outwardly from the lower part of said panel portion, a coin return mechanism supported by said shelf portion, said mechanism including an operating handle extending above said shelf portion, a drumlike receptacle mounted beneath said shelf portion for receiving coins refunded from a coin telephone set, a rotatable vane mounted within said receptacle, said vane sweeping coins out of said receptacle and up to said shelf in response to the operation of said handle.

9. Apparatus in accordance with claim 8 wherein said receptacle includes entrance and exit apertures for refunded coins, a pivotally mounted cover member normally flush with said shelf portion and covering said exit aperture, means locking said cover member in place when said entrance aperture is open thereby to prevent ready access to said last-named aperture from said shelf and means responsive to the upward movement of said vane for pivoting said cover to an open position.

10. Apparatus in accordance with claim 9 including counterweight means to minimize the force required for opening said cover.

11. Apparatus in accordance with claim 9 including constant force spring means for automatically returning said coin return mechanism to a normal rest position after the release of said handle.